May 9, 1961

E. B. ETCHELLS ET AL 2,983,335

ENGINE LUBRICATING SYSTEM

Original Filed Oct. 1, 1954

INVENTORS
Eugene B. Etchells,
Odelbert E. Nolte, &
Harry F. Barr
BY
L. L. Burch
ATTORNEY

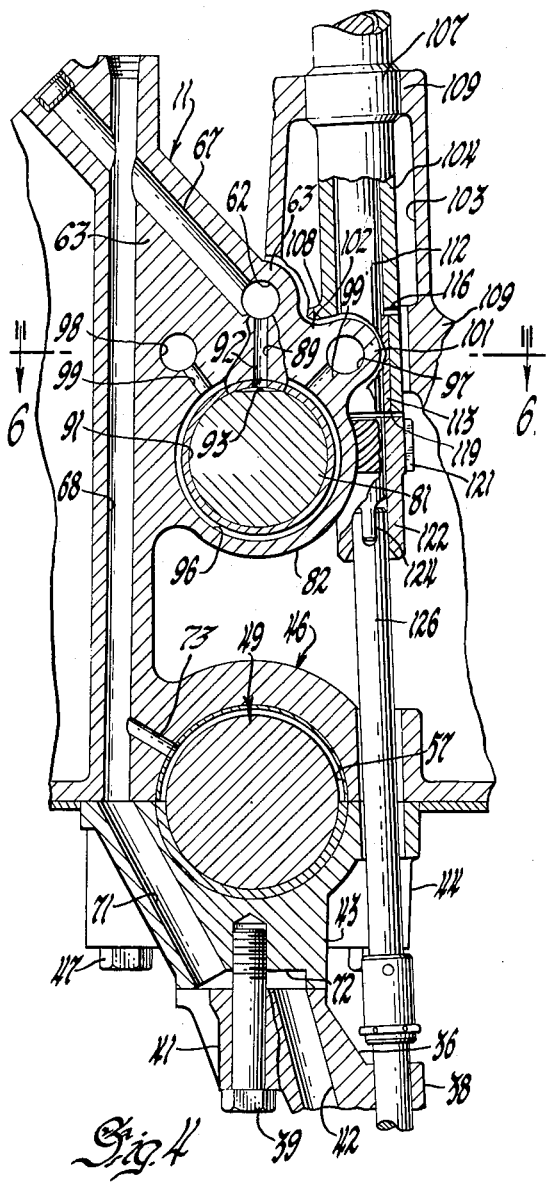
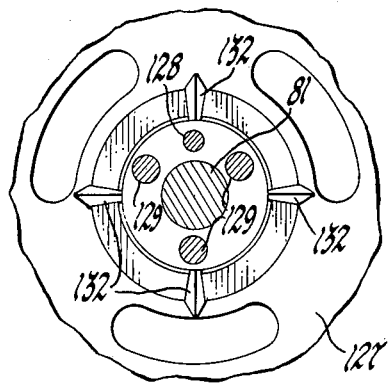
Fig. 5
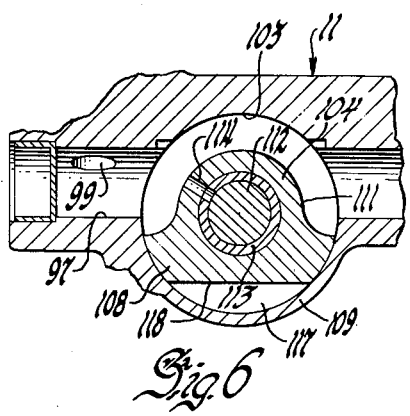
Fig. 6

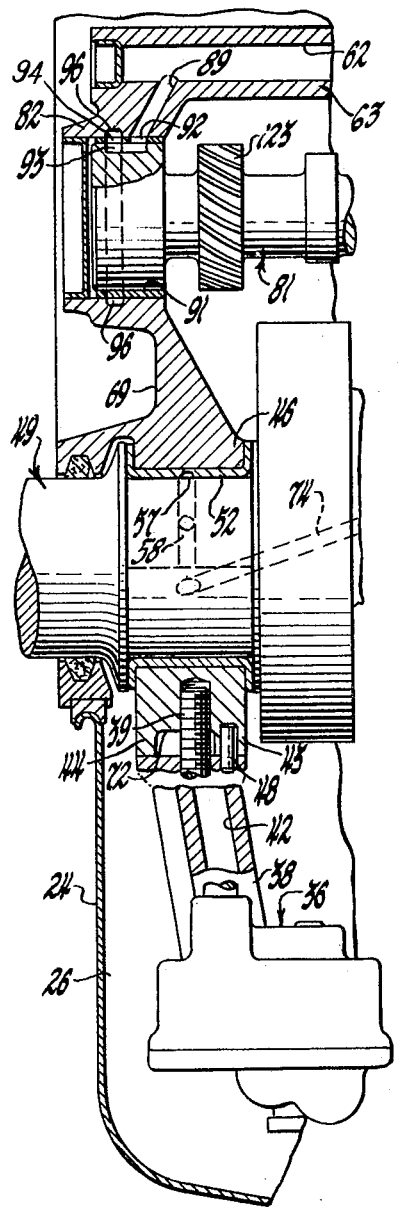
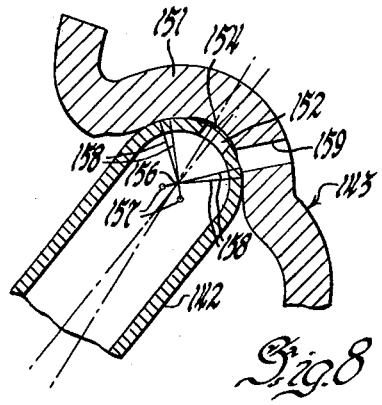
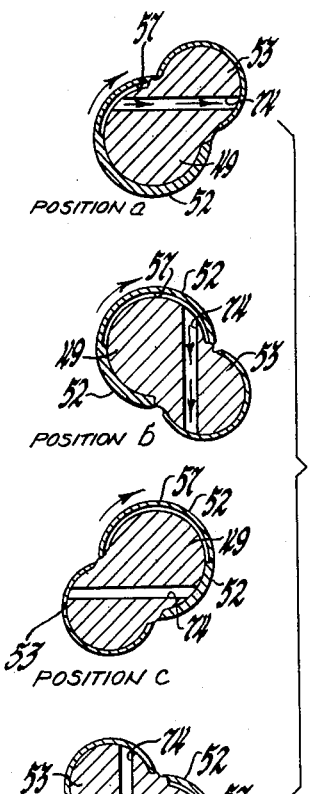

United States Patent Office 2,983,335
Patented May 9, 1961

2,983,335

ENGINE LUBRICATING SYSTEM

Eugene B. Etchells, Birmingham, Adelbert E. Kolbe, Berkley, and Harry F. Barr, Franklin, Mich., assignors to General Motors Corporation, Detroit, Mich., a corporation of Delaware Original application Oct. 1, 1954, Ser. No. 459,668, now Patent No. 2,936,857, dated May 17, 1960. Divided and this application Dec. 1, 1958, Ser. No. 777,391

2 Claims. (Cl. 184—6)

This application is a division of S.N. 459,668, filed October 1, 1954, now Patent No. 2,936,857, issued May 17, 1960, in the names of Harry F. Barr, Eugene B. Etchells and Adelbert E. Kolbe.

This invention relates to lubricating systems for internal combustion engines and has particular relation to lubricating systems for V type internal combustion engines for automotive and other uses.

It is proposed to improve the lubricating system and simplify the construction and service of an internal combustion engine by changing the construction of the oil pump so that the structure may be more easily constructed, assembled and serviced; by changing the lubrication of the main bearings for the crankshaft of the engine so that an increased load may be carried by the bearings without increasing the size of the bearings; by changing the lubrication of the connecting rod bearings so that the bearings may be properly lubricated at lower pressures; by limiting the quantity of the oil supplied to the engaging surfaces of the cylinders and pistons; by supplying oil at reduced and equal pressures from a main supply gallery employed in lubricating the crankshaft and camshaft bearings to distribution galleries employed in lubricating the valve actuating mechanisms for the different banks of cylinders of an engine; by employing oil previously used in lubricating the lower end of the distributor shaft for lubricating the gears employed in driving the shaft, by simplifying the lubrication of the timing gear mechanism and by improving the lubrication and the control of the lubrication for the valves, the valve springs, the rocker arms and the push rods constituting the valve actuating mechanisms for each bank of cylinders of the engine.

Figure 1:
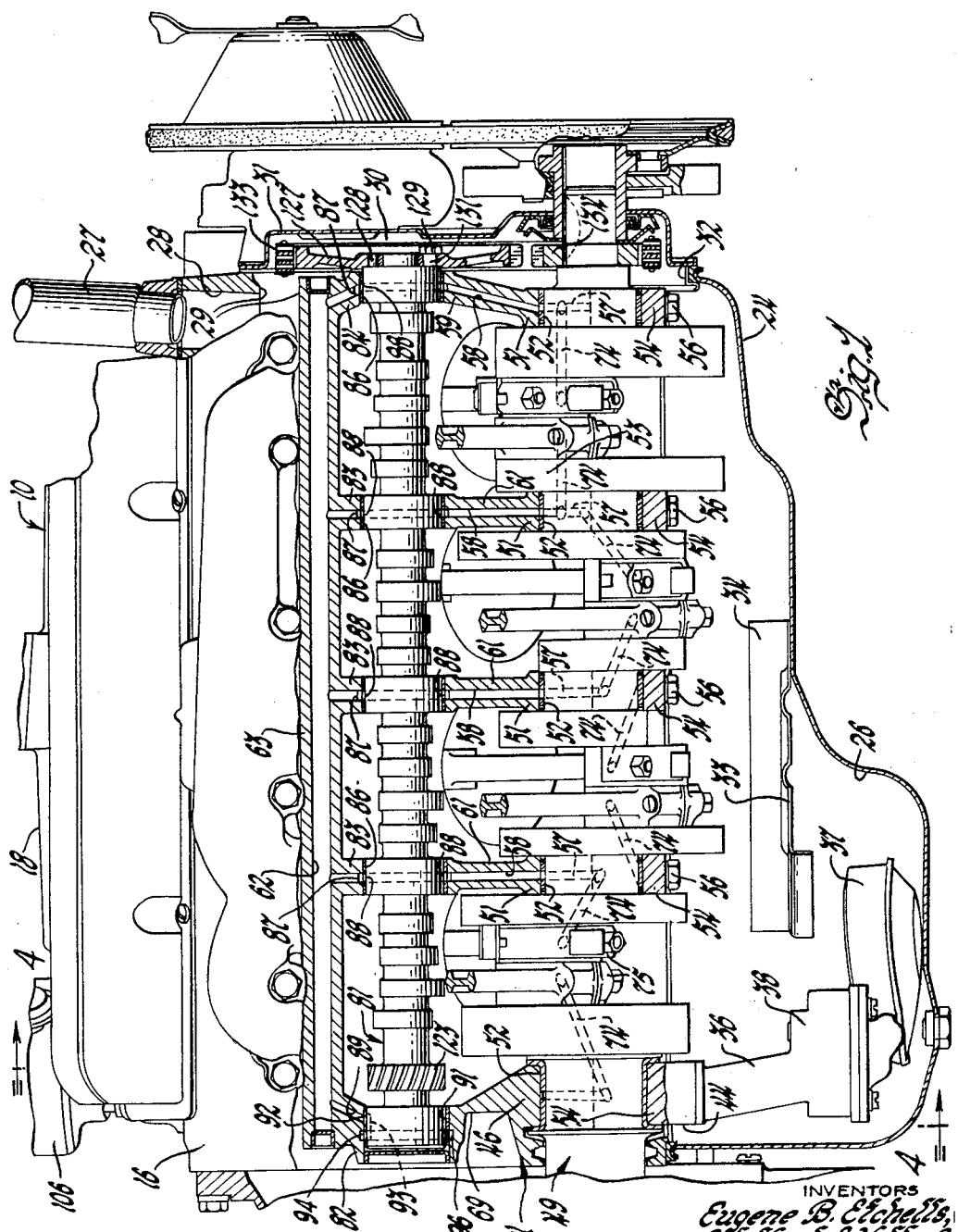
Figure 1 is a longitudinal sectional view of an engine having a lubricating system embodying the features of the invention.

Figure 4 is a fragmentary cross-sectional view taken through the rear crankshaft and camshaft bearing of the engine in the direction of arrows 4—4 of Figure 1 and illustrating the construction and installation of the oil pump, the lubrication of the bearings, the supply of oil to the valve actuating mechanism galleries of the engine and the lubrication of the lower end of the distributor shaft and the distributor shaft drive gear of the engine.

Figure 3:
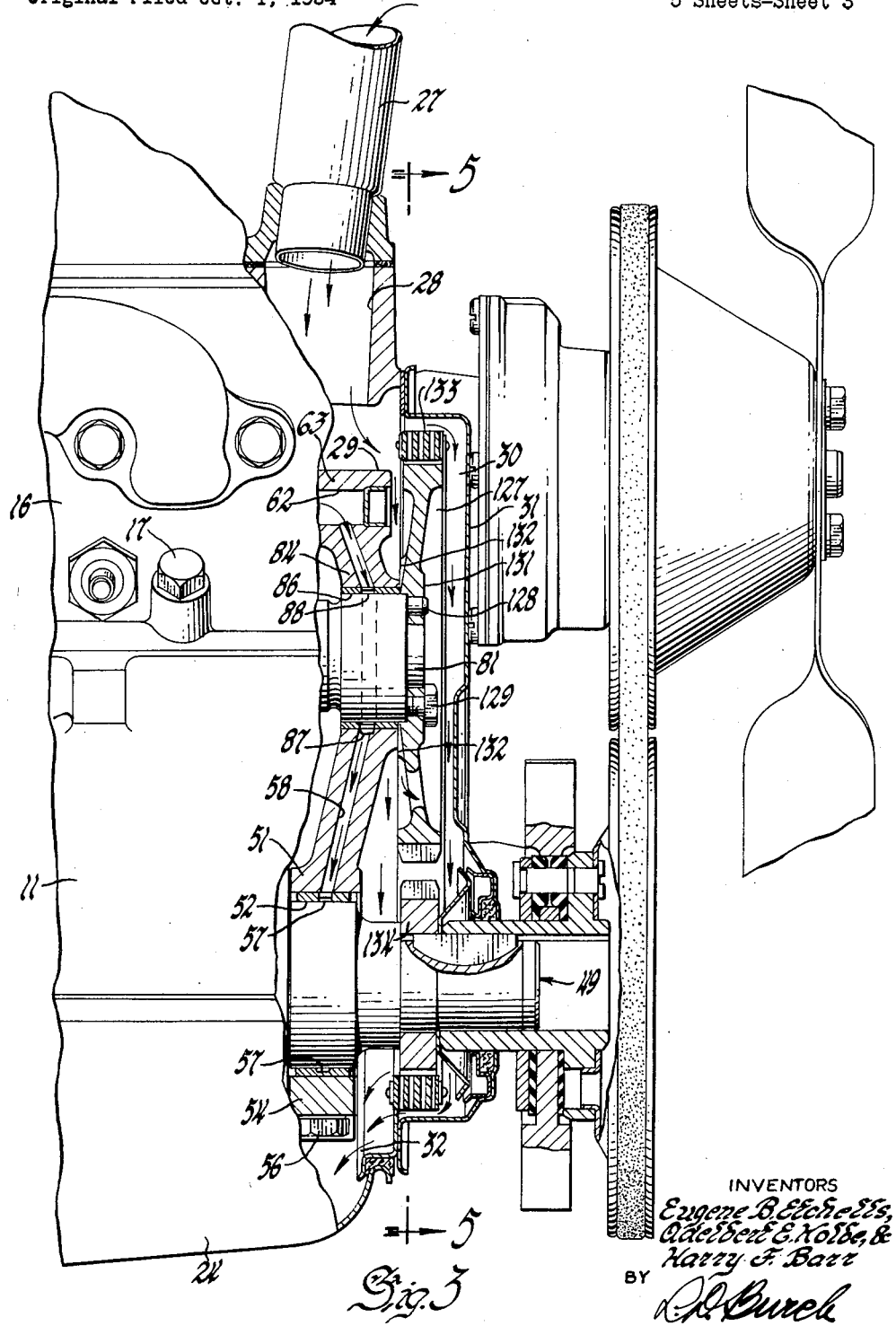
Figure 3 is an enlarged fragmentary view of the front of the engine with parts broken away and shown in cross-section to better illustrate the means by which oil is supplied to the engine and by which the timing gear mechanism of the engine is lubricated.

Figure 5 is a fragmentary cross-sectional view taken substantially in the plane of line 5—5 on Figure 3 and illustrating a feature of the construction of the camshaft drive sprocket by which the camshaft driving mechanism is lubricated.

Figure 6 is a fragmentary cross-sectional view taken substantially in the plane of lines 6—6 on Figure 4 and illustrating the structure involved in lubricating the lower end of the distributor shaft and the driving mechanism for the distributor shaft.

Figure 7 is a fragmentary longitudinal sectional view through the rear end of the engine further illustrating the structure shown by Figure 4.

Figure 8 is an enlarged view of a part of the valve actuating mechanism for one of the cylinders of the engine and illustrating particularly the engaging ends of the push rods and rocker arms employed in the valve actuating mechanism of the engine.

Figure 9 is a diagrammatical illustration of a crankshaft and illustrating at (a), (b), (c) and (d) the lubrication of the main and connecting rod bearings at different positions during each revolution of the crankshaft.

The engine 10 embodying the invention comprises an engine block 11 in which rows of banks 12 and 13 of obliquely disposed cylinders 14 are formed. The rows of cylinders 14 are adapted to be closed by heads 16 which may be removably secured to the cylinder banks 12 and 13 by bolts 17. The manifold structure 18 is secured to the adjacent sides of the heads 16 and to the ends of the block 11 by bolts 19.

The cylinders 14 are adapted to receive reciprocating pistons 21 which are connected by connecting rods 22 to the crankshaft 49 of the engine. The open lower end of the crankcase 20 of the engine is adapted to be closed by an oil pan 24 which at the rear end thereof is enlarged downwardly to provide an oil reservoir or sump 26. The lubricating oil employed in the lubrication system for the engine is adapted to be stored in the sump 26. The lubricating oil may be supplied to the engine through a filler tube 27 which may be secured in a opening in the manifold 18 in position to communicate with a cavity 28 formed in the block 11 and having an opening 29 through the front wall of the block and leading to the timing gear compartment 30 which is enclosed within a cover 31 secured by any suitable means to the front wall of the block 11. The lower extremity of the compartment 30 communicates with the crankcase 20 of the engine through an opening 32 formed between the front main bearing of the engine and the oil pan 24. It will be apparent that oil poured into the filler tube 27 will flow by gravity to the oil sump 26 through the cavity 28, the opening 29, the compartment 30, the opening 32 and the front and downwardly sloping end of the oil pan 24. A horizontally disposed baffle 33 is welded or otherwise secured to the oil pan 24 by side flanges 34. The baffle 32 tends to close the front end of the sump 26 thereby largely preventing surging of the oil in the sump 26 throughout the oil pan 24 under certain conditions of operation of the engine.

An oil pump 36 for circulating oil in the lubricating system of the engine may be located in the rear of the oil pan 24 with the inlet 37 for the pump located to take oil from the central part of the sump 26. The oil pump 36 is provided with a pump casing 38 which may be secured to or removed from the engine by operation of a single bolt indicated at 39. In order that the pump 36 may be installed and removed by operation of the bolt 39 it is proposed to form the casing 38 to provide an enlarged boss 41 adjacent the outlet passage 42 leading from the pump and through the central part of which it is proposed to provide an elongated opening for receiving the bolt 39. The bolt 39 is adapted to project through the opening in the boss 41 and into a threaded opening formed centrally within an enlarged projection 43 extending downwardly from bearing cap 44 for the rear main bearing 46 of the engine. The bearing cap 44 is removably secured to the upper part of the rear main bearing 46 by bolts 47. It is proposed to construct the bolt 39 so that it will be large enough to withstand all of the stresses involved in supporting the oil pump 36 on the bearing cap 44. However, in order to eliminate any possibility that the pump 36 may tend to rotate on the bolt 39 it is proposed to provide a small dowel pin 48 which may be located in aligned openings in the boss 41 and the projection 43 at one side of and parallel to the openings for the bolt 39. It will be apparent that even a small pin made to closely fit the opening in which it is tightly but removably secured will be sufficient to prevent rotation of the pump 36 upon the bearing cap 44. The opening in the projection 43 for the pin 48 may be made to fit the pin somewhat more tightly than the opening in the boss 44. This will cause the pin to remain in the projection 43 when the bolt 39 is removed and the pump is removed from the bearing cap 44. It will be apparent that the labor involved in removing and installing the oil pump 36 by manipulating the bolt 39 will be much less than has been required heretofore with two or more bolts. It will also be apparent that the labor and materials involved in providing one larger bolt in place of a plurality of smaller bolts will not be proportionally greater.

The crankshaft 49 for the engine is supported in the block 11 by rear main bearing 46 and by a plurality of spaced and forwardly disposed main bearings 51. Each of the main bearings 46 and 51 may be provided with bushings 52 which may be constructed in upper halves and lower halves with the upper halves being removably secured in the upper half of each main bearing and the lower halves being removably secured in the bearing cap for each bearing. The forwardly disposed bearings 51 may be positioned between adjacent crankarms 53 of the crankshaft 49 and may have removable bearing caps 54 secured thereto by bolts 56. The bearings 51 may be made shorter than the rear main bearing 46 to decrease the length of the engine.

In order to lubricate the bearings for the crankshaft 49 it is proposed to provide a peripheral groove 57 midway between the axially disposed ends of the upper half of each of the bushings 52. Oil under pressure from the pump 36 may be supplied to the middle of each of the grooves 57 for the bearings 51 by oil passages 58 which are formed in the front end wall 59 and in the transversely disposed intermediate walls 61 of the block 11. The passages 58 are supplied with oil by a main supply gallery 62 formed in a column 63 and extending throughout the length of the block 11, between the cylinder banks 12 and 13 and between the crankcase 20 and the camshaft gallery 64 of the engine 12. The rear end of the main gallery 62 is supplied with oil by passages 67 and 68 which are formed in the rear wall 69 of the block 11. The lower end of the passage 68 communicates with a passage 71 formed in the bearing cap 44 and communicating with outlet passage 42 from the pump 36 through a cavity 72 formed between the plane engaging surfaces of the projection 43 formed on the bearing cap 44 and the boss 41 formed on the pump casing 38. Oil for supplying the groove 57 in the bushing 52 for the rear main bearing 46 is supplied by a passage 73 communicating with the supply passage 68. It will be apparent that if the oil grooves 57 extend only throughout the circumferential length of the upper halves of the bushings 52 and terminate at the adjacent ends of the lower halves of the bushings 52, the lower halves will provide larger bearing surfaces for supporting the journals of the crankshaft 49 than the upper halves of the bushings 52. However, it will be further apparent from examining the engine in the position illustrated by Figure 2 that the greatest load applied to the journals of the crankshaft 49 is applied when the pistons 21 are at or near the outer or upper dead center positions of the pistons in the cylinders 14 and that the smallest load is applied when the pistons 21 are at or near the inner or lower dead center positions of the pistons in the cylinders 14. This maximum load will be applied only to the lower halves of the bushings 52 so that removing the lubrication grooves from the lower halves of the bushings 52 actually decreases the unit load on the lower halves of the bushings 52 when the maximum load is applied thereto by the journals of the crankshaft 49. By leaving out the oil grooves in the lower halves of the bushings 52 it has been found possible to greatly increase the horsepower of the engine without increasing the length of the engine and without increasing the maximum unit load upon the bearings of the engine. It has been found that the bearings are lubricated just as well with an oil groove supplied with oil under pressure only in the upper half of each of the bearing sleeves 52. The journals of the crankshaft 49 each rotate throughout the length of the grooves 57 and consequently pick up oil from the grooves on all parts of the exterior surfaces thereof. Also since the maximum unit bearing pressure may decrease on the lower halves of the bearings, the thickness of the oil film on the lower halves actually may be greater than it would be with oil grooves in the lower halves of the bearings.

It has also been discovered that the connecting rod bearings and the cylinders may be properly lubricated by oil supplied from the grooves 57 in the upper halves of the bushings 52. To do this it has been found desirable to change the angular positions of the passages in the crankshaft and by which oil has been supplied to the connecting rod bearings from the main bearings of the crankshaft. It is now proposed to position these passages obliquely with respect to the radial plane through the axis of the crankshaft and the axis of the crankpin of each crankarm 53 of the crankshaft 49 as is indicated at 74. The passages 74 also extend from midway between the ends of the crankshaft bearings to midway between the ends of the connecting rod bearings. Instead of being positioned in the radial plane of each of the crankarms the passages 74 are positioned to intersect the radial plane of each crankarm substantially midway between the ends of each passage 74. As is illustrated by Figure 9 it is proposed to have the ports at the opposite ends of the passages 74 lead the radial plane of each crankarm in the direction of rotation of the crankshaft by a considerable number of degrees so that when any piston is in outer dead center position with respect to the crankshaft the outlet end of each passage 74 will be substantially beyond the middle of the connecting rod bearing and the inlet end thereof will be near the leading end of one of the oil grooves 57. Position (a) in Figure 9 illustrates a crankarm 53 at the outer dead center position of the piston with the outlet end of port 74 beyond the radial plane of the crankarm, the radial plane extending through the axis of the shaft and the crankpin of the crankarm and beyond the leading end of the groove 57. It will be noted that the outlet end of the passage 74 is considerably beyond the middle of the connecting rod bearing and that the inlet end of the passage 74 is in communication with the leading end of the groove 57. It will be apparent that the minimum clearance between the crankpin and the connecting rod bearing will be at the middle of the connecting rod bearing at outer dead center position of the piston and that the clearance will increase to a maximum at the opposite side of the connecting rod bearing. From position (a) to position (b) the passage 74 will fill the clearance space between the crankpin and the connecting rod bearing with oil. Since the groove 57 extends throughout 180° of the arcuate extent of the bushing 52 and since the outlet end of passage 74 is always beyond the position where there is a minimum clearance between the crankpin and the connecting rod bearing, it will be apparent that the passage 74 will supply oil to the clearance space between the crankpin and the connecting rod bearing throughout at least 180° of rotation of the crankshaft 49. This 180° of rotation of the crankshaft will occur when the clearance between the crankpin and the connecting rod bearing increases from minimum to maximum clearances. It will be apparent that the oil in the bearing will tend to flow outwardly toward the axially disposed ends of the bearing substantially throughout the entire clearance in the bearing. Since the crankpin rotates throughout 360° within the connecting rod bearing it will be apparent that the entire peripheral surface of the crankpin will be supplied with oil from the clearance space between the crankpin and the connecting rod bearing. Notwithstanding that the passage 74 is not in communication with the groove 57 in positions (c) and (d) it will be apparent that the passage 74 is filled with oil and that centrifugal force resulting from rotation of the crankshaft may cause the oil to tend to flow from the outlet end of the passage 74. This also will tend to lubricate the connecting rod bearing because this will reduce the oil pressure in the main bearing at the inlet end of the passage 74 and will tend to cause the oil that has been squeezed from the main bearing to flow inwardly of the main bearing and into the inlet end of the passage 74.

Figure 2:
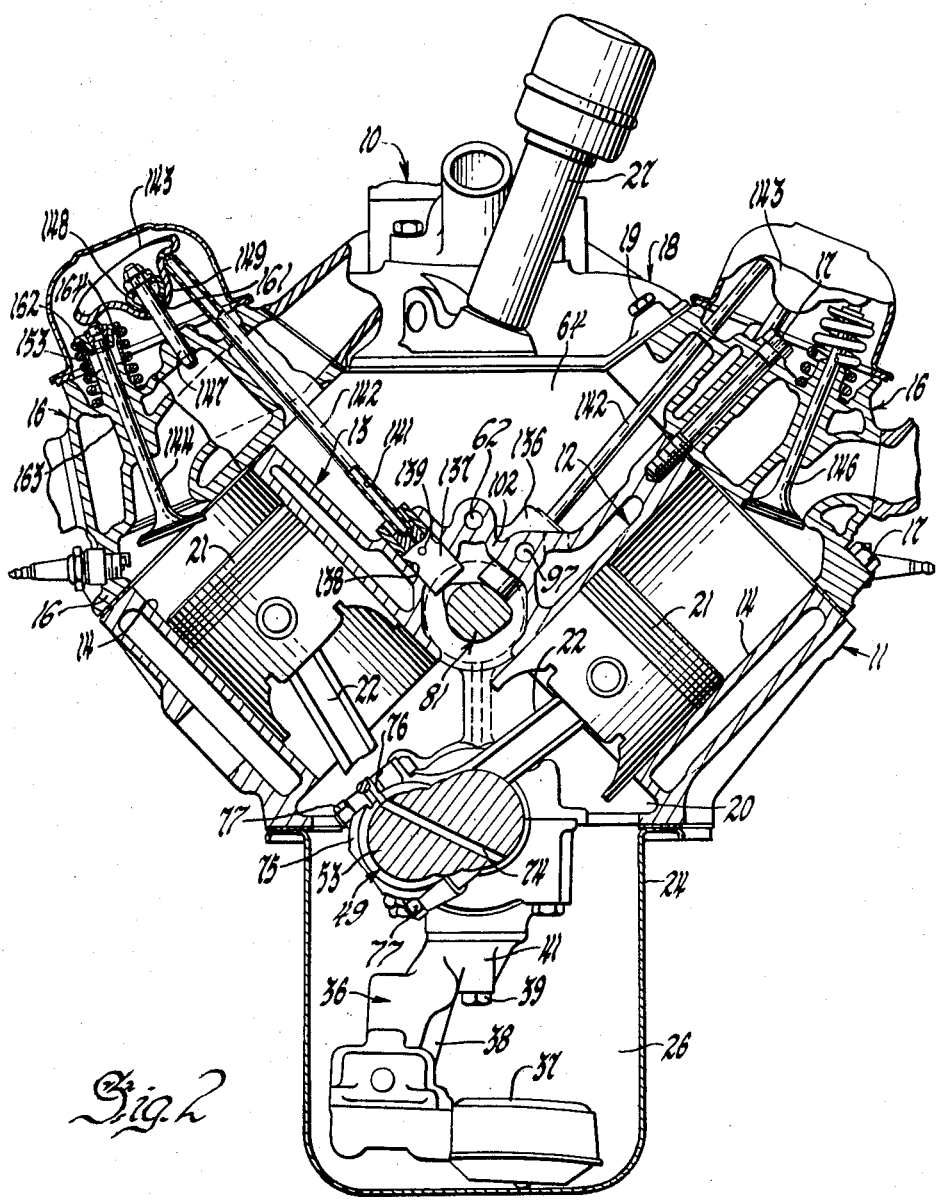
Figure 2 is a cross-sectional view of the engine disclosed by Figure 1.

As will be apparent from Figure 2, a slot 76 is formed in one side of each of the connecting rod bearings between the surfaces where the bearing caps 75 are bolted at 77 to the rod end part of each connecting rod 22. The outlet ends of the passages 74 approach the slots 76 as the slots 76 are directed toward the cylinders 14 in the bank of cylinders opposite that to which the connecting rod 22 operates one of the pistons 21. When the passage 74 so registers with one of the slots 76 the oil in the passage 74 is forced outwardly by centrifugal force and thereby discharges a spray of oil on the opposing cylinder 14 and substantially entirely across the opposing cylinder 14. Figure 2 illustrates one of the slots 76 in position to spray oil from the passage 74 on one of the cylinders in the bank of cylinders 13. However, the slot 76 shown by Figure 2 is in a connecting rod 22 for one of the cylinders in the cylinder bank 12. The connecting rods 22 for the cylinders in the bank of cylinders 13 also are provided with slots 76 which register with the passages 74 to spray oil on the cylinders in the cylinder bank 12 when the crankshaft is in the proper position. Position (c) in Figure 9 represents one of the passages 74 approaching the slot 76 as shown by Figure 2. Position (d) in Figure 9 illustrates the position of one of the passages 74 as it approaches a slot 76 in one of the connecting rods for the bank of cylinders 13 when the slot is in a position to lubricate one of the cylinders in the bank of cylinders 13.

It will be apparent from the foregoing that the invention provides a simple, inexpensive and effective means for lubricating the main bearing, the connecting rod bearings and the pistons and cylinders while decreasing the maximum unit pressure affecting the main bearings. This is done without increasing the length of the engine or the expense involved in manufacturing the engine.

The camshaft 81 of the engine also is supported in a bearing 82 formed in the rear wall 69. In front of the bearing 82 are intermediate bearings 83 formed in the transverse walls 61 and front bearing 84 formed in the front wall 59, the latter bearings also supporting the camshaft 81. The bearings 83 and 84 of the camshaft are all lubricated by oil supplied by the passages 58 from the main supply passage 62. To accomplish this the bearings 83 and 84 each may be provided with bushings 86 around which annular grooves 87 which form parts of the passages 58 are formed in the bearings 83 and 84. From the grooves 87 the journals of the camshaft are lubricated by openings 88 formed in the bushings 86 in diametrically opposed relation to one another and in alignment with the passages 58. The rear bearing 82 of the camshaft is supplied with oil by a passage 89 which is formed on the rear wall 69 and which communicates with the main supply passage 62. The bearing 82 has a bearing sleeve 91 which is provided with an opening 92 that intermittently communicates with an axially extending slot 93 that is formed in the journal of the camshaft and which terminates in spaced relation to the ends of the bushing 91. The rotation of the slot 93 with the shaft 81 will apply the oil supplied by the opening 92 and the passage 89 to the interior surface of the bushing 91. The bushing 91 also is provided with an opening 94 which is located in axial alignment with the opening 92 and in the plane of the end of the slot 93. An annular groove 96 formed in the bearing 82 around the bushing 91 and in a position to communicate with the opening 94 is connected by the slot 93 to the passage 89 once during each revolution of the camshaft 81. Since the oil is supplied to the groove 96 only once during each revolution of the camshaft 81 it will be apparent that the pressure in the groove 96 will not be as great as the pressure in the main supply passage 62. The oil at reduced pressure in the groove 96 is supplied to tappet or valve actuating mechanism galleries 97 and 98 by connecting passages 99. The galleries or passages 97 and 98 are disposed in columns 101 which extend substantially throughout the length of the block 11 and are positioned on opposite sides of the column 63 in which the main supply passage 62 is formed. The columns 101 and 63 merge with one another to form a web 102 that extends across the block 11 between the lower parts of the cylinder banks 12 and 13 and above the camshaft 81.

Immediately in front of the bearing 82 the passage 97 is intersected by a cavity 103 which is formed in the block 11 for receiving an elongated distributor shaft casing 104. The casing 104 forms a lower part of the casing of the ignition distributor 106 which is mounted at the rear of the engine and which controls the ignition of the charges in the cylinders of the engine. The tubular casing 104 has enlarged cylindrical bosses 107 and 108 formed therein which are adapted to form a relatively tight but removable fit within inwardly disposed flanges 109 formed on the block 11 at the opposite ends of the cavity 103. The bosses 107 and 108 are the guiding means by which the distributor shaft casing 104 is mounted within the block of the engine. It will be noted that the boss 108 is disposed in the inwardly disposed flange 109 in such a way as to intersect the passage 97 between the upper and lower extremities of the boss 108. However, in order to provide a continuation of the passage 97 across the boss 108, the boss 108 is formed to provide an arcuate groove 111 midway between the upper and lower ends of the boss 108. The groove 111 is substantially as large in cross-sectional area as the passage 97 so as not to interfere with the flow of oil in the passage 97. However, the parts of the boss 108 above and below the groove 111 tightly fit the flange 109 and therefore prevent leakage of oil from the groove 111 and the passage 97 upwardly and downwardly within the cavity 103. The distributor shaft 112 extends downwardly within the casing 104 and at the lower end thereof is rotatably mounted in a bushing 113. The bushing 113 and the shaft 112 therein are lubricated by a passage 114 that extends across the boss 108 and the bushing 113 between the arcuate groove 111 and the shaft 112. The passage 114 is located between the upper and lower ends of the bushing 113 but somewhat nearer the upper than the lower end of the bushing 113. Within the bushing 113 the oil supplied by the passage 114 will flow upwardly and downwardly therefrom by surface tension and capillary attraction. The oil which flows upwardly within the bushing 113 will collect around the shaft 112 at the upper end of the bushing 113 where it will drain outwardly of the casing 104 through a passage 116. The outer end of the passage 116 communicates with the upper end of passage 117 which is formed within the flange 109 and axially of the shaft 112 by forming a plane surface 118 on one side of and throughout the length of the boss 108. The oil from the passage 116 will flow downwardly by gravity in the passage 117 for the purpose of lubricating thrust bearing 119 and gear 121 located at the lower end of the shaft 112. The gear 121 is formed on the upper end of a sleeve 122 which is secured in any suitable manner to the lower end of the shaft 112 beyond the casing 104. A thrust washer disposed between the upper end of the sleeve 122 and the lower end of the casing 104 forms the thrust bearing 119. The gear 121 is adapted to mesh with gear 123 located on the camshaft 81 in front of the bearing 82 for driving the distributor shaft 112 through the gear 121. It will be apparent that the oil supplied by the opening 116 will not only lubricate the thrust bearing 119 and the gear 121 but will also lubricate the teeth of the gear 123 on the camshaft 81. The oil that flows downwardly within the bushing 113 from the opening 114 will follow the shaft 112 and will lubricate the coupling 124 between the lower end of the shaft 112 and the shaft 126 which drives the oil pump 36. The coupling 124 is of a conventional tongue and slot construction and is formed within the lower extremity of the sleeve 122.

The timing sprocket or gear 127 which drives the camshaft 81 is secured on the front end of the camshaft by a pin 128 and a plurality of bolts 129. The hub 131 of the gear 127 rotates against the front end of the camshaft bearing 84. To lubricate the relatively rotating surfaces of the hub 131 and the end of the bearing 84 the hub 131 is provided with a plurality of radially disposed slots indicated at 132. The inner extremities of the slots 132 terminate at the end of the bushing 86 for the camshaft bearing 84. Oil that is supplied to the bearing 84 by the passage 58 and the annular groove 87 will flow in opposite directions from the openings 88 and some of the oil will collect at the front end of the bushing 86. The oil so collected will lubricate the engaging thrust surfaces of the hub 131 and the bearing 84 and the oil which collects in the slots 132 will be thrown outwardly by centrifugal force and against the rim of the gear 127 and the timing chain 133. Timing chain 133 drives the gear 127 through gear 134 which is mounted on the front end of the crankshaft 49.

The distribution passages for galleries 97 and 98 extend through the block 11 in such a way as to intersect the openings in the bosses 136 in which the valve lifters 137 for the engine are mounted. However, the lifters are provided with annular grooves 138 which provide for the continuous flow of oil in the passages 97 and 98. The oil is supplied to the interior of the lifters 137 by passages 139 which communicate with the grooves 138. The lifters 137 may be of any desired form but in the present instance may be hyrdaulic lifters as disclosed by Papenguth in United States Patent No. 2,818,050, issued December 31, 1957. It is considered preferable to employ valve lifters through which oil may be supplied to passages 141 formed throughout the length of push rods 142 which are adapted to operate between the valve lifters 137 and rocker arms 143 for operating the valves of the engine. In the present instance one rocker arm 143 is provided for the inlet valve 144 and one for the exhaust valve 146 for each cylinder of the engine 10. The rocker arms 143 are supported on the heads 16 of the engine by pins 147, the upper ends of which carry hemispherical bearings 148 that engage sockets 149 extending inwardly between the opposite ends of the rocker arms 143. As is best shown by Figure 8 the rocker arms 143 are provided with sockets 151 at the push rod engaging ends thereof and in which the upper ends of the push rods 142 are seated. In order to supply oil to the interior of the sockets 151 the upper ends of the push rods 142 are provided with axially disposed openings 152 through which the oil from the push rods is supplied to the clearance space between the ends of the push rods and the sockets 151. In order to provide bearing engagement between the push rods and the sockets and to provide means for lubricating the sockets 109 and the valve springs 153 with which the valves 144 and 106 are provided, it is proposed to form the socket engaging ends of the push rods 142 and the push rod engaging surfaces of the sockets 151 in such manner as to provide cavities 154 within the bearing surfaces between the ends of the push rods and the sockets. To provide the cavities 154 it is proposed to make the ends of the push rods 142 of uniform radii which will provide hemispherical end surfaces for engaging the sockets 151. Then it is proposed to form the sockets 151 by arcuate surfaces of rotation of greater radii of curvature than the radii of curvatures of the ends of the push rods. This may be done by making the center of the radii of curvature of the end of the rod 142 at 156 whereas the centers of curvature of the two arcuate surfaces forming the socket 151 are at 157. The lines 158 represent the opposite extremes of movement of the circular lines of contact between the sockets 151 and the end of the push rods 142. It is proposed to provide passages 159 through the sockets 151 in such a position that the circular lines of contact between the push rods and the sockets will always be adjacent the outer edge of the passage 159. The opposite edges of the passages 159 will extend beyond the circular lines of contact and will overlap the cavities 154 between the ends of the push rods and the sockets. The passage 159 therefore will be in a position to supply oil to the opposite surface of the rocker arms 143 within the limit of the capacity of the small clearance at the outer peripheral edges of the cavities 154. However, the passages 159 are positioned far enough away from the passages 152 to avoid overlapping. The oil supplied by the passages 152 therefore will be at all times metered to the passages 159 through the small clearance spaces at the edges of the cavities 154 and adjacent the circular lines of contact between the ends of the push rods and the sockets.

The oil which is supplied to the outer surface of the rocker arms 143 by the passages 159 will move by surface tension downwardly into the sockets 149 to lubricate the surfaces between the sockets and the bearings 148. The excess oil will be discharged from the sockets 149 through the clearance openings 161. However, some of the oil will move by surface tension toward the opposite ends of the rocker arms 143 and will lubricate the valve springs 153 and the outer ends of the valve stems for the valves 144 and 146 by moving over the flanged edges of the rocker arms 143 at the valve engaging ends thereof. This will be an extremely limited and metered quantity of oil but it will be sufficient to lubricate the valve stems and the valve springs and it will not supply excess oil to such an extent as to interfere with the operation of the engine. Some of the oil supplied to the ends of the valve stems will move by surface tension through the valve spring washers 162 and by moving down the stems of the valves 144 and 146 will lubricate the guides 163 in which the valve stems are mounted in the heads 16. The valve springs 153 may be provided with internally disposed sleeves 164 to insure that an excess amount of oil is not supplied to the valve guides 163.

We claim:

1. A lubrication system for an internal combustion engine having a distribution passage formed therein and to which it is desirable to supply oil at reduced pressure from a main oil supply passage and comprising a shaft mounted for rotation in said engine and having a bearing, an axially disposed slot formed in said shaft and having the ends thereof terminating between the opposite ends of said bearing, a pair of axially aligned passages formed in said bearing and being adapted to intermittently communicate with said slot during the rotation of said shaft, means connecting one of said pair of passages to said main supply passage, and means connecting the other of said pair of passages to said distribution passages.

2. A lubrication system for an internal combustion engine having a camshaft and a valve operating mechanism and a pair of oil distribution passages for supplying oil from a main supply passage for lubricating said valve operating mechanism, a bearing formed in said engine for supporting said camshaft, an axially disposed slot formed in said camshaft and having the opposite ends thereof terminating within said bearing, a pair of axially aligned ports formed in said bearing and intermittently communicating with opposite ends of said slot during the rotation of said camshaft, means connecting one of said ports to said main supply passage, an annular channel formed around said bearing and intersecting the other of said ports for receiving the oil supplied by said slot to said other of said ports, and means for connecting said annular groove to said distribution passages.

References Cited in the file of this patent

UNITED STATES PATENTS

| | | |
|---|---|---|
| 981,251 | Eames | Jan. 10, 1911 |
| 1,428,177 | Mead | Sept. 5, 1922 |
| 1,631,537 | Krenzke | June 7, 1927 |
| 1,806,537 | Bower | May 19, 1931 |
| 1,823,714 | Vincent | Sept. 15, 1931 |
| 1,899,949 | Fahrney | Mar. 7, 1933 |
| 2,010,696 | L'Orange | Aug. 6, 1935 |
| 2,568,729 | Good | Sept. 25, 1951 |